(12) United States Patent
Gray et al.

(10) Patent No.: US 9,148,300 B2
(45) Date of Patent: Sep. 29, 2015

(54) METHOD AND SYSTEM FOR TELECOMMUNICATIONS INCLUDING SELF-ORGANIZING SCALABLE ETHERNET USING IS-IS HIERARCHY

(75) Inventors: Eric Ward Gray, Lee, NH (US); James V. Luciani, Acton, MA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 850 days.

(21) Appl. No.: 12/746,435

(22) PCT Filed: Nov. 12, 2008

(86) PCT No.: PCT/US2008/012695
§ 371 (c)(1),
(2), (4) Date: Jun. 4, 2010

(87) PCT Pub. No.: WO2009/064407
PCT Pub. Date: May 22, 2009

(65) Prior Publication Data
US 2010/0284418 A1    Nov. 11, 2010

Related U.S. Application Data

(60) Provisional application No. 61/003,357, filed on Nov. 16, 2007.

(51) Int. Cl.
*H04L 12/46* (2006.01)
*H04L 12/715* (2013.01)
*H04L 12/721* (2013.01)

(52) U.S. Cl.
CPC .......... *H04L 12/465* (2013.01); *H04L 12/4687* (2013.01); *H04L 12/4691* (2013.01); *H04L 45/04* (2013.01); *H04L 45/12* (2013.01)

(58) Field of Classification Search
CPC .............. H04L 12/465; H04L 12/4687; H04L 12/4691; H04L 45/04; H04L 45/12
USPC .......................................... 370/401; 709/230
See application file for complete search history.

(56) References Cited

U.S. PATENT DOCUMENTS

| | | | |
|---|---|---|---|
| 6,363,319 B1* | 3/2002 | Hsu | 701/533 |
| 7,483,387 B2* | 1/2009 | Guichard et al. | 370/252 |
| 2005/0114522 A1 | 5/2005 | LaVigne et al. | |
| 2007/0208871 A1* | 9/2007 | Vasseur et al. | 709/230 |

* cited by examiner

*Primary Examiner* — Man Phan
*Assistant Examiner* — Mandish Randhawa

(57) ABSTRACT

A first aggregation node in communication with the first network and the second network, the source node and internal nodes of the first network only having knowledge of each other and of the first aggregation node. The system includes a second aggregate node in communication with the second network and the third network, the internal nodes of the second network only having knowledge of each other and the first and second aggregate nodes, the destination node and the internal nodes of the third network only having knowledge of each other and the second aggregation node, the first and second aggregation nodes only having knowledge of each other, the destination node receiving the data from the source node using a link state routing protocol and shortest path bridging through the first second and third networks and the first and second aggregation nodes.

14 Claims, 10 Drawing Sheets

METHOD AND SYSTEM FOR TELECOMMUNICATIONS INCLUDING SELF-ORGANIZING SCALABLE ETHERNET USING IS-IS HIERARCHY

This application claims the benefit of U.S. Provisional Application No. 61/003,357, filed Nov. 16, 2007, the disclosure of which is fully incorporated herein by reference.

FIELD OF THE INVENTION

The present invention is related to a telecommunications system using a link state routing protocol and shortest path bridging through a plurality of networks. More specifically, the present invention is related to a telecommunications system using a link state routing protocol and shortest path bridging through a plurality of networks where the link state routing protocol is either IS-IS, PNNI or OSPF.

BACKGROUND OF THE INVENTION

Numerous people have publicly claimed that there are serious issues with the number of adjacencies that may arise as a result of per-VLAN instances of any link-state routing protocol (such as IS-IS or OSPF). Yet per-VLAN instancing is—by far—the simplest and most elegant approach to using a link state routing protocol for determining paths to be used in shortest path bridging.

Approaches discussed thus far—that may be used to deal with this—are all essentially based on either limiting the scale to which shortest path bridging might extend in conjunction with VLANs, or complicating the link state routing interactions by introducing an un-natural divergence between the real VLAN topology and the effective forwarding paths to be applied.

These concerns stem from a belief that as many as 4K VLANs may be configured with a large overlap among edge bridges in VLAN membership, forcing as many as 16M adjacencies to be potentially maintained at each edge bridge.

BRIEF SUMMARY OF THE INVENTION

The present invention pertains to a telecommunications system. The system comprises a first network having internal nodes and a source node which transmits data. The system comprises a second network having internal nodes. The system comprises a first aggregation node in communication with the first network and the second network, the source node and internal nodes of the first network only having knowledge of each other and of the first aggregation node. The system comprises at least a third network having internal nodes and a destination node. The system comprises a second aggregate node in communication with the second network and the third network, the internal nodes of the second network only having knowledge of each other and the first and second aggregate nodes, the destination node and the internal nodes of the third network only having knowledge of each other and the second aggregation node, the first and second aggregation nodes only having knowledge of each other, the first aggregation node having knowledge of the source node and the internal nodes of the first and second networks, the second aggregate node having knowledge of the destination node and the internal nodes of the second and third networks, the destination node receiving the data from the source node using a link state routing protocol and shortest path bridging through the first, second and third networks and the first and second aggregation nodes.

The present invention pertains to a method for telecommunications. The method comprises the steps of sending data from a source node of a first network having internal nodes. There is the step of receiving the data at a first aggregation node in communication with the first network and a second network, the source node and internal nodes of the first network only having knowledge of each other and of the first aggregation node. There is the step of sending the data from the first aggregation node through the second network. There is the step of receiving the data from the first aggregation node at a second aggregation node in communication with the first network and the second network. There is the step of sending the data from the second aggregation node through at least a third network having internal nodes and a destination node. There is the step of receiving the data from the second aggregation node at the destination node, the internal node's of the second network only having knowledge of each other and the first and second aggregate nodes, the destination node and the internal nodes of the third network only having knowledge of each other and the second aggregation node, the first and second aggregation nodes only having knowledge of each other, the first aggregation node having knowledge of the source node and the internal nodes of the first and second networks, the second aggregate node having knowledge of the destination node and the internal nodes of the second and third networks, the destination node receiving the data from the source node using a link state routing protocol and shortest path bridging through the first, second and third networks and the first and second aggregation nodes.

DETAILED DESCRIPTION OF THE INVENTION

Figure 10:
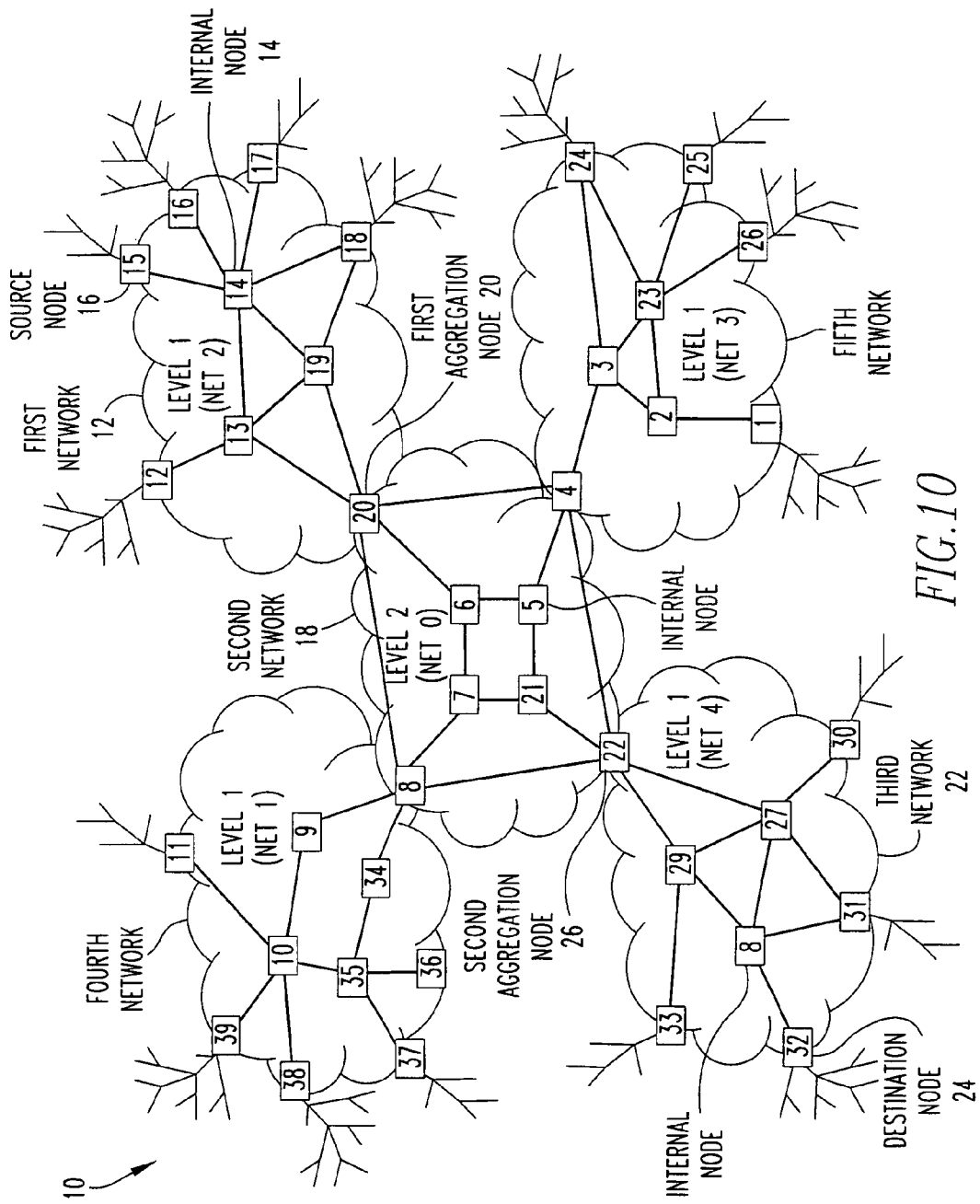
FIG. 10 shows a telecommunications system.

Referring now to the drawings wherein like reference numerals refer to similar or identical parts throughout the several views, and more specifically to FIG. 10 thereof, there is shown a telecommunications system. The system comprises a first network having internal nodes and a source node which transmits data. The system comprises a second network having internal nodes. The system comprises a first aggregation node in communication with the first network and the second network, the source node and internal nodes of the first network only having knowledge of each other and of the first aggregation node. The system comprises at least a third network having internal nodes and a destination node. The system comprises a second aggregate node in communication with the second network and the third network, the internal nodes of the second network only having knowledge of each other and the first and second aggregate nodes, the destination node and the internal nodes of the third network only having knowledge of each other and the second aggregation node, the first and second aggregation nodes only having knowledge of each other, the first aggregation node having knowledge of the source node and the internal nodes of the first and second networks, the second aggregate node having knowledge of the destination node and the internal nodes of the second and third networks, the destination node receiving the data from the source node using a link state routing protocol and shortest path bridging through the first, second and third networks and the first and second aggregation nodes.

Preferably, the first aggregation node has summarized information of the internal nodes of the second network which is available to the internal nodes and the source node of the first network. The second aggregation node preferably has summarized information of the internal nodes of the third networks which is available to the internal nodes of the second network. Preferably, the first aggregation node has summarized information of the internal nodes and the source node of the first network which is available to the internal nodes of the second network. The second aggregation node preferably has summarized information of the internal nodes and the destination node of the third network which is available to the internal nodes of the second network. Preferably, the link state routing protocol is either IS-IS, PNNI or OSPF.

The present invention pertains to a method for telecommunications. The method comprises the steps of sending data from a source node of a first network having internal nodes. There is the step of receiving the data at a first aggregation node in communication with the first network and a second network, the source node and internal nodes of the first network only having knowledge of each other and of the first aggregation node. There is the step of sending the data from the first aggregation node through the second network. There is the step of receiving the data from the first aggregation node at a second aggregation node in communication with the first network and the second network. There is the step of sending the data from the second aggregation node through at least a third network having internal nodes and a destination node. There is the step of receiving the data from the second aggregation node at the destination node, the internal nodes of the second network only having knowledge of each other and the first and second aggregate nodes, the destination node and the internal nodes of the third network only having knowledge of each other and the second aggregation node, the first and second aggregation nodes only having knowledge of each other, the first aggregation node having knowledge of the source node and the internal nodes of the first and second networks, the second aggregate node having knowledge of the destination node and the internal nodes of the second and third networks, the destination node receiving the data from the source node using a link state routing protocol and shortest path bridging through the first, second and third networks and the first and second aggregation nodes.

The first aggregation node preferably has summarized information of the internal nodes of the second network, and including the step of making available to the internal nodes and the source node of the first network the summarized information. The second aggregation node preferably has summarized information of the internal nodes of the third network, and including the step of making available to the internal nodes and the source node of the third network the summarized information of the internal nodes of the third network. Preferably, the first aggregation node has summarized information of the internal nodes and the source node of the first network, and including the step of making available to the internal nodes of the second network the summarized information of the internal nodes and the source node of the first network. The second aggregation node preferably has summarized information of the internal nodes and the destination node of the third network, and including the step of making available to the internal nodes of the second network the summarized information of the internal nodes and the destination node of the third network. Preferably, the link state routing protocol is either IS-IS, PNNI or OSPF.

For exemplary purposes, a node can be a router, server, or computer end user station. A node will typically have a CPU or computer, memory and input and output ports, which may or may not serve as both.

In the operation of the preferred embodiment, IS-IS (as an example link state routing protocol, used for routing in OSI and IP networks) is used to self-organize VLANs. The invention allows for using IS-IS levels (hierarchy, similar to backbone and stub area concepts in OSPF) to form a natural VLAN hierarchy using Q-in-Q encapsulation and shortest path bridging.

IS-IS levels (level 2 corresponding to the backbone, level 1 to surrounding stub networks) are combined with VLAN (Q-in-Q) hierarchical tunneling to drastically reduce the scaling concerns in very large Ethernet network topologies. The invention introduces the possibility for self-organizing hierarchy based on this use of IS-IS levels in conjunction with Q-in-Q encapsulation.

This is a significant improvement over technology that has been discussed up to this point in efforts relating to Ethernet, shortest path bridging and use of link state routing protocols in layer two networks.

Several concepts have been discussed in connection with using a link state routing protocol to determine self consistent shortest paths for use in Ethernet networks. Among the concepts discussed is the notion of using Q-in-Q VLAN encapsulation to reduce the complexity and scale issues experienced in traversing the shortest-path, bridged Ethernet, portion of a LAN.

In all such discussions, there has been an assumption that VLANs in stub LANs would be mapped to a common VLAN—including all stub LANs that share a common set of VLANs—or on a 1:1 basis (where each stub VLAN is mapped to exactly one shortest-path, bridged Ethernet VLAN).

This discussion has led people to conclude that there will be issues in either the scale of VLAN interactions with link state routing, or in the complexity of configuration required to circumvent the scale issue. In some cases, there is even some concern that both issues may apply (in—for example—a very complex extended Ethernet LAN topology).

In internal discussions (collectively involving the listed inventors), it became apparent that there is no particular reason why VLAN re-mapping needs to occur at the edge boundary between shortest-path bridged Ethernet and LAN stubs and that such a VLAN re-mapping is quite natural—and potentially self organizing—if it in fact occurs at an IS-IS Level (or OSPF Area) boundary.

Figure 9:
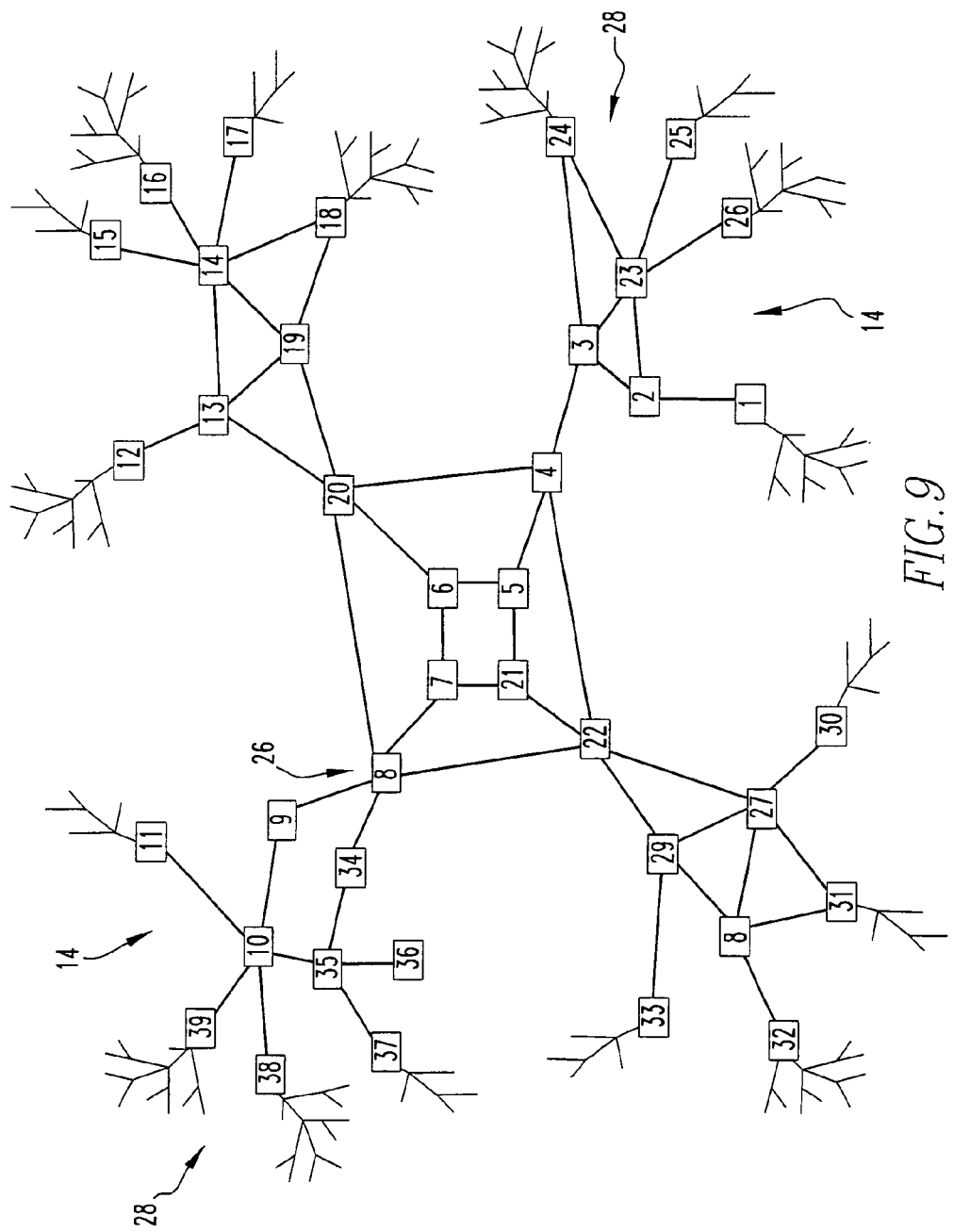
FIG. 9 shows a number of LAN stubs connected hierarchically using shortest path bridged networks.

FIG. 9 shows a number of LAN stubs (using some variation of Ethernet 802.1D bridging and spanning tree protocol) connected hierarchically using shortest path bridged networks (shown as heavier links). If there are a large number of VLANs present across a majority of the stub physical LANs thus connected, non-hierarchical networking approaches may lead to the need for large numbers of IS-IS (or OSPF) routing instances and a correspondingly larger ($N^2$) number of adjacencies.

Instead, with the invention, FIG. 9 uses link state routing hierarchy to form the topology shown in FIG. 10.

Using this approach allows the L1L2 boundary routers to scope the visibility of VLANs and significantly reduce the number of instances required in many of the intermediate shortest path bridges (those shown in the Level cloud in particular), and the number of adjacencies required at each shortest path bridge. The number of adjacencies required in each Level 1 "stub" is limited because of the fact that the Level 1 shortest path bridges form adjacencies only with each other and the L1L2 boundary shortest path bridge. The number of adjacencies in the Level 2 "backbone" may be significantly lower both because of the potentially significant reduction in the number of VLANs in this part of the network and the fact that adjacencies are only formed within the Level 2 network itself.

The specifics of the shortest path bridging technology—beyond the use of a link-state routing protocol (specifically such as IS-IS or OSPF) to determine local shortest paths—is independent of this invention. It may—for example—be as subsequently defined for shortest path bridging in the TRILL effort of the IETF, or an effort to define shortest path bridging in the IEEE 802.1 (Interworking) effort.

This approach is easily extended to become self organizing by adding a communication method—such as TLV extensions to IS-IS—to convey information about VLAN membership within the Level 2 network. This allows the devices to be configured (or to self-configure) VLAN mappings in such a way as to provide aggregate VLANs containing L1L2 boundary instances for common VLAN connectivity.

The scalability of the ultimate solution can be further improved by providing (or defining) a parameter that identifies the number of aggregate VLANs to be created by the above mapping. This can—for example—be set (or defined) to be 64 (or less), effectively reducing the number of instances (or adjacencies) to a number that is effectively already supportable in existing bridges.

As described above, this invention effectively addresses existing scaling issues for any realistically sized Ethernet deployment—up to an including large Ethernet subnets made possible by IPv6 networking.

Figure 1:
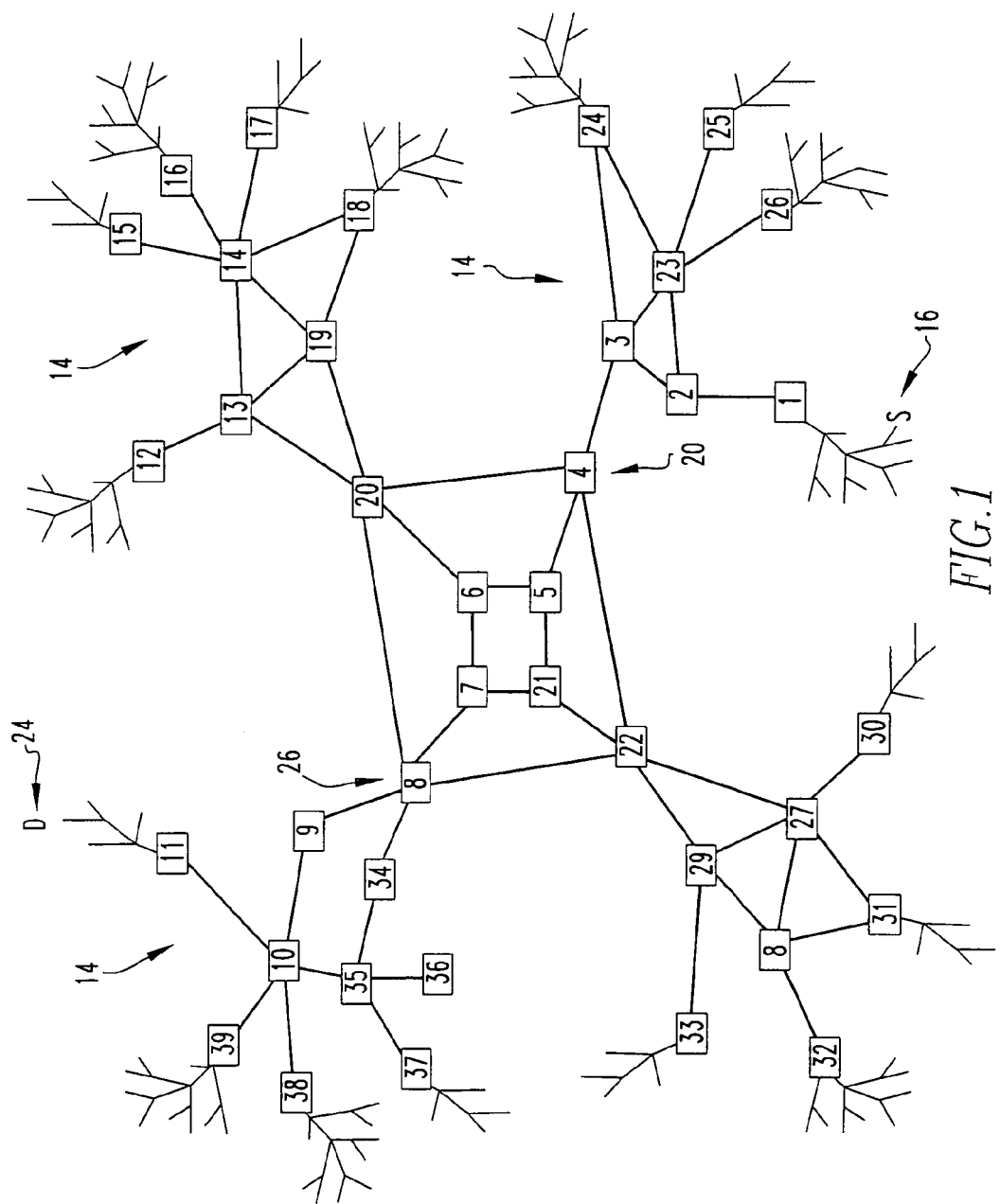
FIG. 1 shows a flat topology of shortest path bridges in a network including a source S of frames that are forwarded to a destination D.

FIG. 1 shows a flat topology of shortest path bridges, designed to employ a link state routing protocol to find the shortest path across the network from any bridge, to any other bridge in the same bridging domain/topology; such a shortest path would then be used to forward frames—for example—from source S to destination D.

Figure 2:
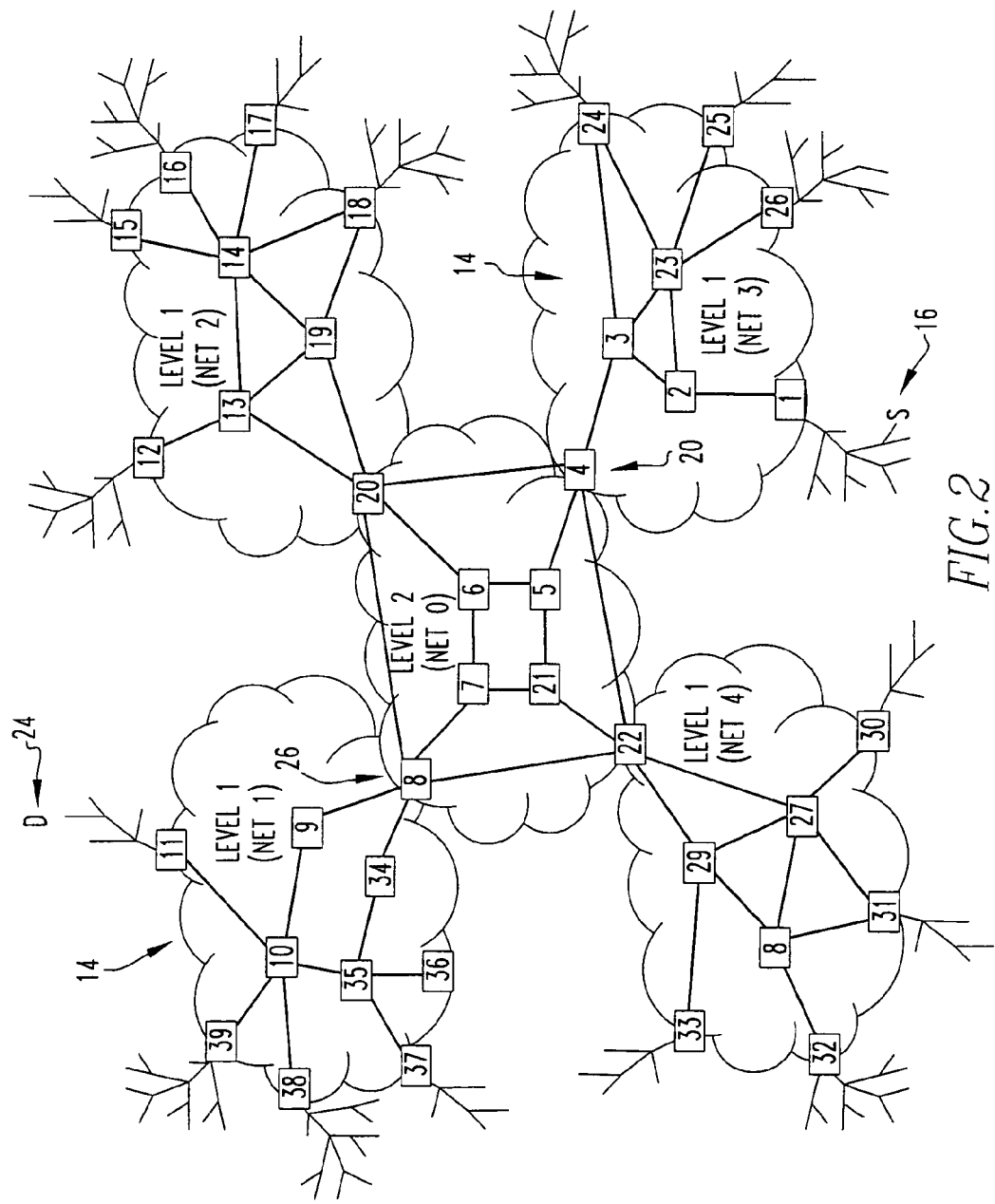
FIG. 2 shows the same topology shown in FIG. 1 but hierarchically organized.
Figure 3:
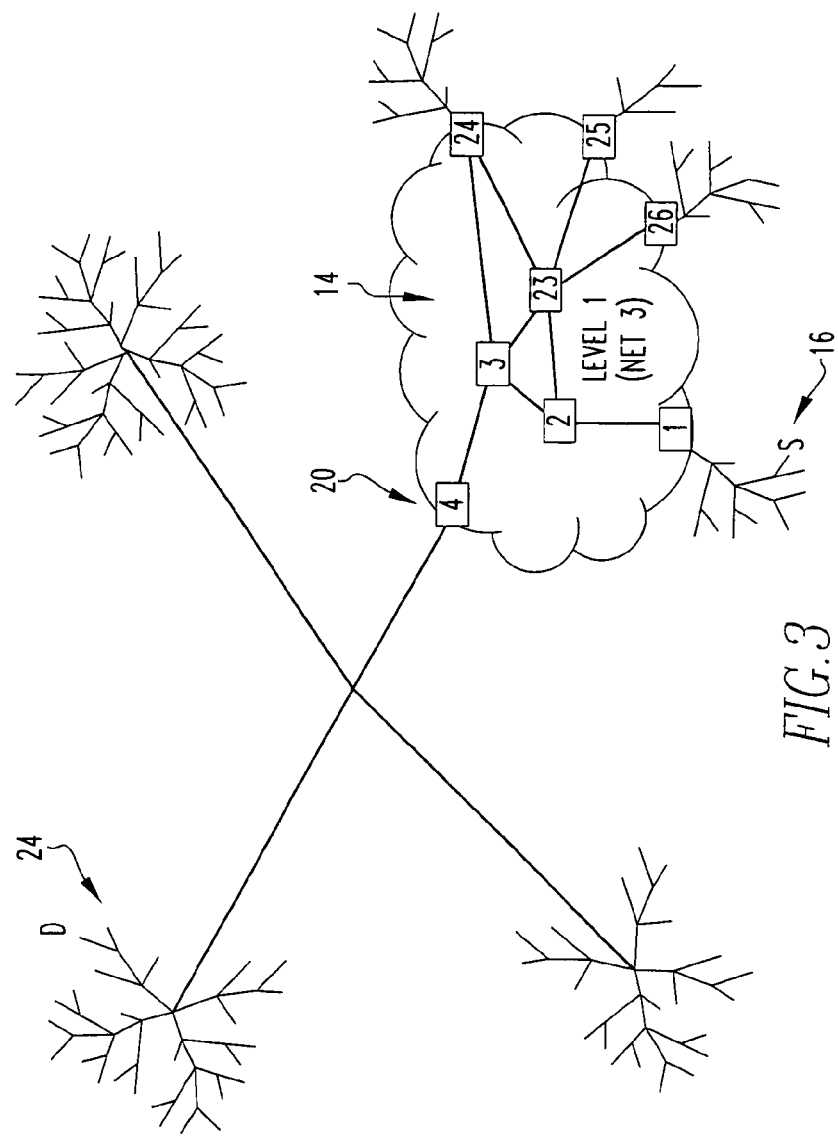
FIG. 3 shows a first simplified topology of the complete topology shown in FIG. 1 in a sub-domain traversed by a frame delivered from source S to destination D.
Figure 4:
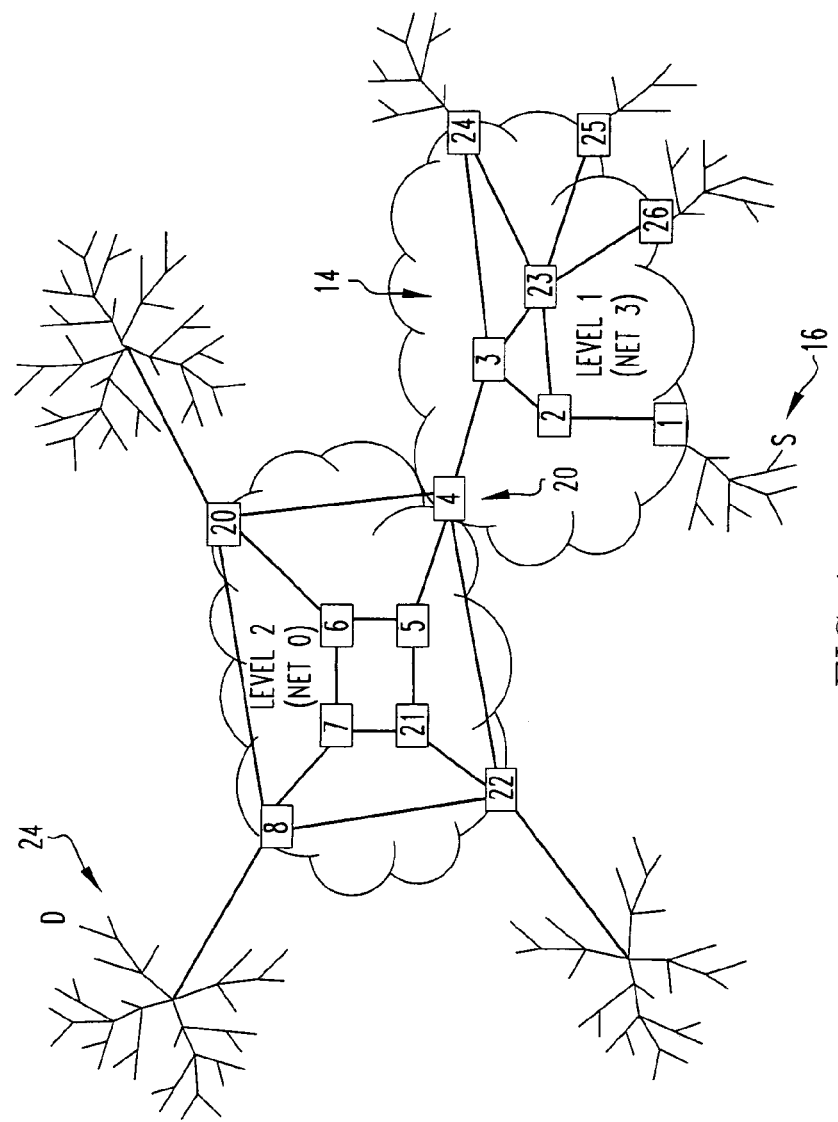
FIG. 4 shows a second simplified topology of the complete topology shown in FIG. 1 in a sub-domain traversed by a frame delivered from source S to destination D.
Figure 5:
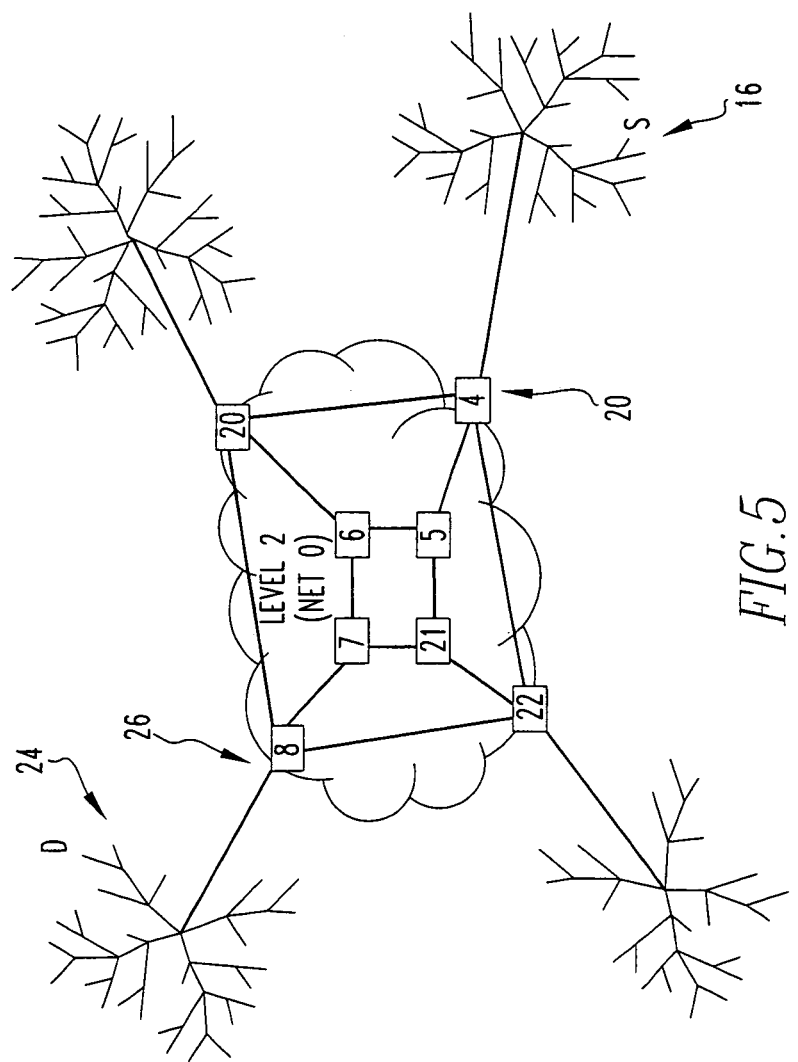
FIG. 5 shows a third simplified topology of the complete topology shown in FIG. 1 in a sub-domain traversed by a frame delivered from source S to destination D.
Figure 6:
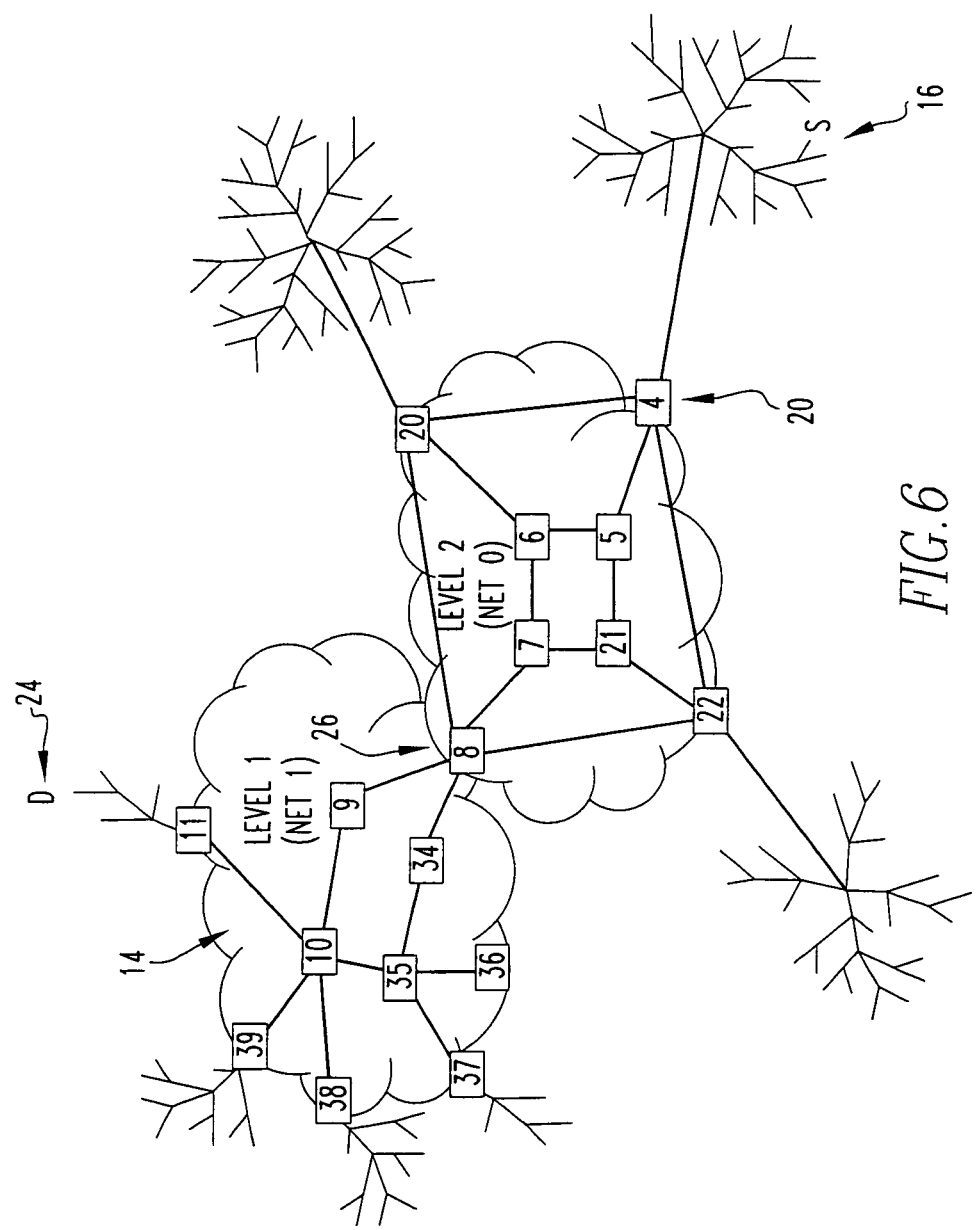
FIG. 6 shows a fourth simplified topology of the complete topology shown in FIG. 1 in a sub-domain traversed by a frame delivered from source S to destination D.
Figure 7:
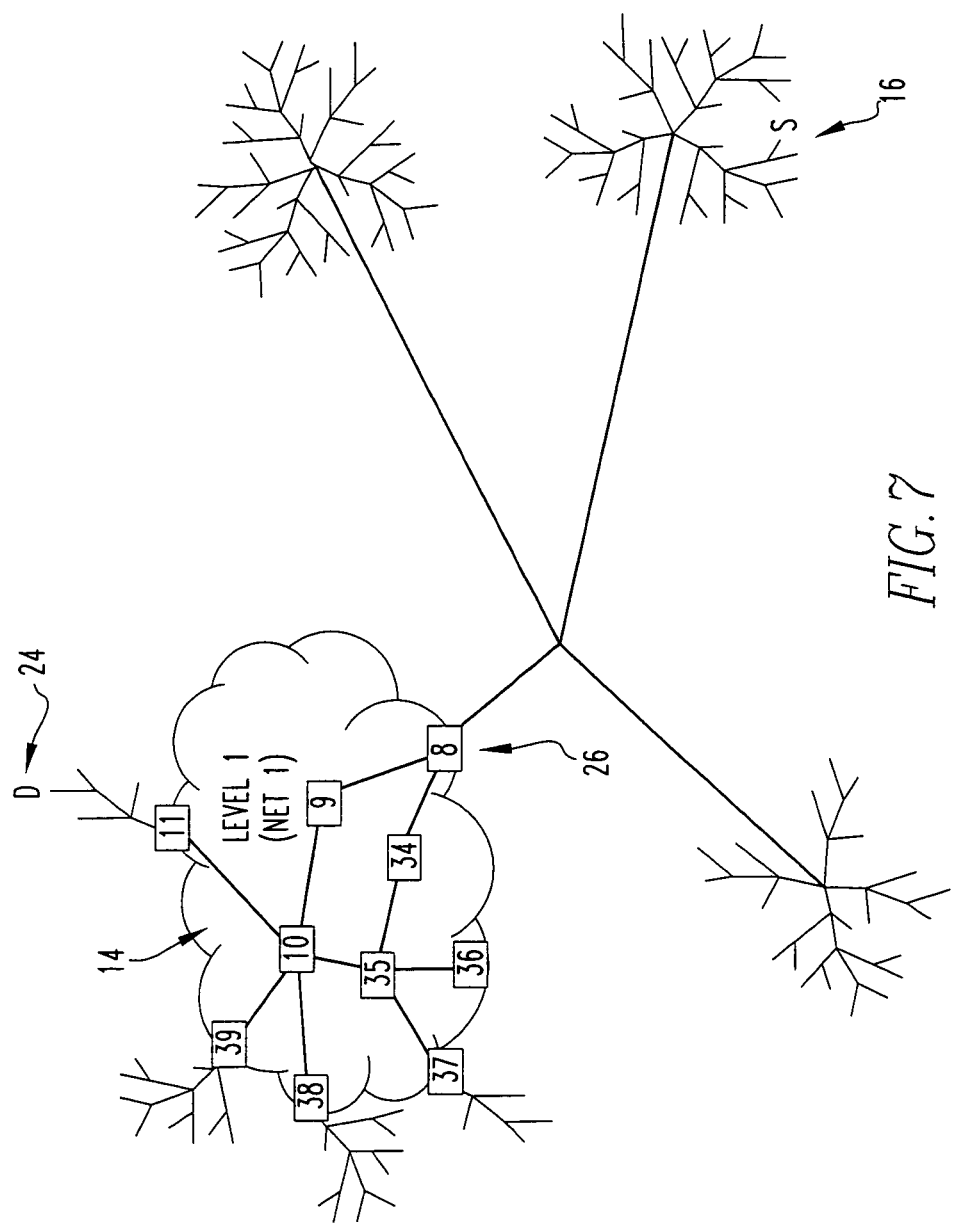
FIG. 7 shows a fifth simplified topology of the complete topology shown in FIG. 1 in a sub-domain traversed by a frame delivered from source S to destination D.

FIG. 2 shows the same topology hierarchically organized—in this case into a two level hierarchy (this may—in the case of OSPF or IS-IS—be the limit of hierarchical organization; this limit would not apply if using PNNI).

FIGS. 3 through 7 show resulting simplified topologies as would appear from the perspective of the listed bridge (or bridges) in each sub-domain of the complete topology, for bridges in sub-domains traversed by a frame delivered from source S to destination D.

This is an illustration of the reasonably well known scale (and local view simplification) advantages to be expected by organizing a network hierarchically and summarizing topology information for the extended topology outside of a local portion of the networking domain.

However, in the case of using link state routing for layer 2 networks—containing VLANs—the potential for summarization advantage is multiplied very significantly.

For example—from FIG. 2 (or any of FIG. 1, 6 or 7)—bridges 11 and 39 might be aggregation bridges with 1,000 or more ports having each port mapped to a different VLAN for links connecting these two bridges to bridge 10. Bridge 10 could then have the forwarding properties of existing 802.1Q (VLAN) bridges—but could potentially be required to peer with bridges 11, 39, 8, 36 and 38 for each of the more than 1,000 VLANs for which bridge (and 11 and 13, at least) would be configured.

From this, it can be seen that peering on a per VLAN basis is likely to result in potentially severe complexity issues. As the number of VLANs (maximum of 4,094) and the number of bridge interfaces increase at each bridge, peering complexity can become far worse. At present, the greatest concern is the messaging complexity since the number of messages sent on a periodic basis (on the order of a small number of seconds) is directly related to the number of peer relationships being maintained across any given link. This messaging complexity can—in some case—be reduced significantly by—for example—using a compressed VID state messaging representation such as that defined for MVRP (or earlier versions of compact GVRP).

See, for example, this published paper, incorporated by reference herein:
http://www.ieee802.oro/1/files/public/docs2003/MvrpIntro01.pdf The applicability of this approach—for shortest path bridging—is limited to point to point links, however. While, in today's networks, this is the common case—it is not the only case. Moreover, this approach does not reduce the actual per-VLAN state information contained in the messages (although in a compressed format) as well as the need to maintain per-VLAN state machines, based on the uncompressed VLAN state information.

Because of this effective complexity multiplication, the use of hierarchically organization may be critical for scaling the use of shortest path bridges to reasonably large networks. However, this results in extremely complicated configuration.

What is proposed here is to reduce the complexity of the required configuration in multiple ways:

1. by potentially evaluating the topology (automatically determined using the link state protocol) to select optimal summarization points, and 2. by determining appropriate VLAN groupings and establishing trunk VLANs to be used in each hierarchically determined network sub-domain.

For simplicity, the figures provided assume that summarization points (or boundary bridges—see bridges 4, 8, and 22 in FIG. 1, 2, 4, 5 or 6) are determined statically by locating the appropriate bridge type at key points in the unorganized topology. However, the determination may also be made on a dynamic basis (perhaps using redundantly positioned bridges in response to any persistent topology change), using any of a number of known distributed election or graph optimization algorithms to select the appropriate summarization/boundary bridges from among a number of eligible candidates.

VLAN grouping may similarly be chosen by using—for example—an annealing or constraint relaxation algorithm to determine approximate-optimal groupings of VLANs. Optimal is defined in terms of these considerations:

1) VLAN groups are defined within the context of a given local sub-domain;

2) the number of VLAN groups should be minimal and not more than the number of VLANs attached to the sub-domain;

3) ideally, each VLAN group will include as "edge bridges" within the sub-domain and VLAN group only those bridges attached to all VLANs in the VLAN group—however, this is the constraint subject to relaxation in any algorithm in order to achieve objective 2 above;

4) each "edge bridge" must be contained in at least one VLAN group for all VLANs to which it is attached;

5) the algorithm then selects VLAN IDs to map the VLAN Ids of each determined VLAN group for use in VLAN trunking.

The algorithm may determine VLAN groups such that some or all resulting VLAN trunks contain at most some number X of domain edge bridges that are not members of the VLAN and may be required to discard flooded, broadcast or multicast frames delivered for VLANs to which they are not attached. Any algorithm used may be controlled via parameters—such as a value for X above—to achieve acceptable performance under differing conditions or desired performance criteria.

Current proposals for shortest path bridging, assume that frames transported within the domain are encapsulated using a 802.1Q frame format, followed by a TRILL header, followed by some form of Ethernet frame format. See—for example—the Internet Draft protocol specification, incorporated by reference herein, at:
http://www.ietf.org/internet-drafts/draft-ietf-trill-rbridge-protocol-05.txt In the VLAN case considered for this proposal (most common case), the header format is <outer .1Q><TRILL><inner .1Q>.

The common assumption at this point is that the outer portion (<outer .1Q>) will be either the default, or a configured value for the point-to-point case and is—at this point undetermined for the non-point-to-point case. Again, while the point-to-point case is the common case, it is not the only case, is not always detectable by any form of automated detection. Also, use of a detection scheme can produce various bad (pathological) behaviors if either a third party remains undetected on an assumed point-to-point link, or if the state changes to and from point-to-point frequently.

In current designs, there is no consideration given to the possibility of changing the VLAN ID given in the inner (<inner .1Q>) header—nor does this proposal suggest doing so. However, this proposal assumes that the VLAN ID in the outer (<outer .1Q>) header can be deterministically re-mapped without affecting the inner VLAN ID—according to the VLAN to VLAN-group-ID determination proposed above.

Figure 8:
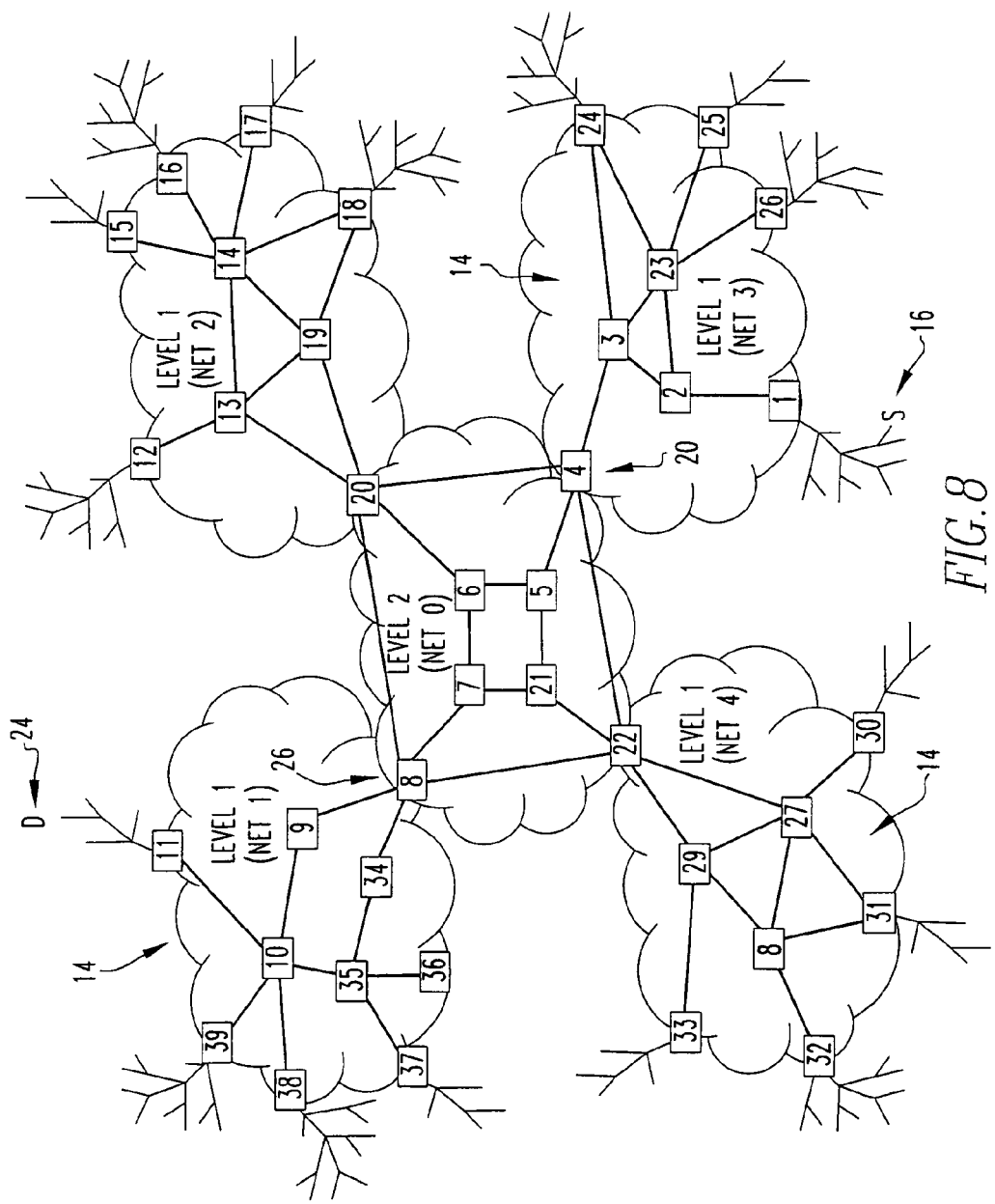
FIG. 8 shows a forwarding process for a frame sent by source S to destination D in the topology of FIG. 1.

Hence, the forwarding process for a frame sent by source S in FIG. 8 is as follows:

1) the frame arrives at bridge 1, and is mapped to a local VLAN ID for outer (<outer .1Q>) encapsulation (the VLAN ID is as determined based on the described algorithm);

2) an intermediate header may be inserted at this point, assuming the shortest path bridging paradigm is either similar to or exactly as defined by TRILL (see reference above);

3) the frame is then forwarded via bridges 2 and 3 to the sub-domain boundary bridge 4 using standard shortest path bridging;

4) the frame arrives at bridge 4, and is mapped to a local VLAN ID for replacement (<outer .1Q>) encapsulation—this VLAN ID may or may not be different from the VLAN ID used previously, and is specific to this sub-domain (again, it is as determined by the described algorithm);

5) the frame is then forwarded via bridges 5, 6 and 7 to sub-domain boundary bridge 8 using standard shortest path bridging;

6) the frame arrives at bridge 8, and is mapped to a local VLAN ID for replacement (<outer .1Q>) encapsulation—this VLAN ID may or may not be different from the VLAN ID used previously, and is specific to this sub-domain (again, it is as determined by the described algorithm);

7) the frame is then forwarded via bridges 9 and 10 to bridge 11 using standard shortest path bridging;

8) the frame arrives at bridge 11 and the (<outer 0.1Q>) header is removed;

9) if an intermediate header was inserted in step 2 above, it is also removed;

10) the frame is forwarded to destination D—exactly as it was received in step 1 above (assuming no additional mapping is required by the specific application, or deployment, scenario).

The VLAN ID re-mapping in steps 1, 4 and 6 is what I earlier referred to as "VLAN trunking."

The term "edge bridge" refers to a summarization/boundary (such as bridge 4 or 8 in the example) or an ingress/egress point (such as bridge 1 or 11 in the example). It is the point at which frames either enter or leave a sub-domain of the shortest path bridging domain.

Any method to determine which of the bridges will be the summarization points can be used—though the simple approach is that they are the only eligible ones and are configured to be summarization points (a more dynamic approach is described above); and any method can be used to determine an optimal VLAN group mapping (to reduce the complexity of VLAN state information that must be maintained in various parts of the network—particularly in the core, or backbone). The "self-organization" results from creating hierarchy in the network and then computing a "VLAN reduction" mapping in each sub-domain of the network—created in making it hierarchical.

| Abbreviations | |
|---|---|
| IEEE | Institute of Electrical and Electronic Engineers |
| IETF | Internet Engineering Task Force |
| IP | Internet Protocol (versions 4 or 6) |
| IS-IS | Intermediate System to Intermediate System (routing protocol) |
| L1L2 | Layer 1, Layer 2 (boundary) |
| LAN | Local Area Network |
| OSPF | Open Shortest Path First (routing protocol) |
| Q-in-Q | Common use abbreviation of 802.1Q re-encapsulation of 802.1Q frames. |
| TRILL | Transparent RoutIng over Lots of Links |
| VLAN | Virtual LAN |

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A telecommunications system comprising:
a first network having internal nodes and a source node which transmits data;
a second network having internal nodes;
a first aggregation node in communication with the first network and the second network, the source node and internal nodes of the first network only having knowledge of each other and of the first aggregation node;
at least a third network having internal nodes and a destination node; and
a second aggregation node in communication with the second network and the third network, the internal nodes of the second network only having knowledge of each other and the first and second aggregation nodes, the destination node and the internal nodes of the third network only having knowledge of each other and the second aggregation node, the first aggregation node having knowledge of the source node and the internal nodes of the first and second networks, the second aggregation node having knowledge of the destination node and the internal nodes of the second and third networks, the destination node receiving the data from the source node using a link state routing protocol and shortest path bridging through the first, second and third networks and the first and second aggregation nodes, the link state routing protocol finding the shortest path across the first, second or third network from any bridge,
wherein at least one of the first, second or third networks has virtual local area networks (VLANs), and VLANs are grouped by using one of an annealing or constraint relaxation algorithm to determine approximate-optimal groupings of VLANs.

2. A system as described in claim 1 wherein the first aggregation node has summarized information of the internal nodes of the second network which is available to the internal nodes and the source node of the first network.

3. A system as described in claim 1 wherein the second aggregation node has summarized information of the internal nodes of the third networks which is available to the internal nodes of the second network.

4. A system as described in claim 1 wherein the first aggregation node has summarized information of the internal nodes and the source node of the first network which is available to the internal nodes of the second network.

5. A system as described in claim 1 wherein the second aggregation node has summarized information of the internal nodes and the destination node of the third network which is available to the internal nodes of the second network.

6. A system as described in claim 1 wherein the link state routing protocol is either Intermediate System to Intermediate System IS-IS), Private Network-to-Network Interface (PNNI) or Open Shortest Path first (OSPF).

7. A system as described in claim 1 wherein optimal is defined in terms of at least one of a plurality of considerations, the plurality of considerations including:
VLAN groups are defined within the context of a given local sub-domain;
a number of VLAN groups is not more than a number of VLANs attached to the sub-domain;
each VLAN group includes as edge bridges within the sub-domain and VLAN group only those bridges attached to all VLANs in the VLAN group; and
each edge bridge is contained in at least one VLAN group for all VLANs to which it is attached.

8. A method for telecommunications comprising the steps of:
sending data from a source node of a first network having internal nodes;
receiving the data at a first aggregation node in communication with the first network and a second network, the source node and internal nodes of the first network only having knowledge of each other and of the first aggregation node;
sending the data from the first aggregation node through the second network;
receiving the data from the first aggregation node at a second aggregation node in communication with the first network and the second network;
sending the data from the second aggregation node through at least a third network having internal nodes and a destination node; and
receiving the data from the second aggregation node at the destination node, the internal nodes of the second network only having knowledge of each other and the first and second aggregation nodes, the destination node and the internal nodes of the third network only having knowledge of each other and the second aggregation node, the first aggregation node having knowledge of the source node and the internal nodes of the first and second networks, the second aggregate node having knowledge of the destination node and the internal nodes of the second and third networks, the destination node receiving the data from the source node using a link state routing protocol and shortest path bridging through the first, second and third networks and the first and second aggregation nodes, the link state routing protocol finding the shortest path across the first, second or third network from any bridge,
wherein at least one of the first, second or third networks has virtual local area networks (VLANs), VLANs are grouped by using one of an annealing or constraint relaxation algorithm to determine approximate-optimal groupings of VLANs.

9. A method as described in claim 8 wherein the first aggregation node has summarized information of the internal nodes of the second network, and including the step of making available to the internal nodes and the source node of the first network the summarized information.

10. A method as described in claim 8 wherein the second aggregation node has summarized information of the internal nodes of the third network, and including the step of making available to the internal nodes and the source node of the third network the summarized information of the internal nodes of the third network.

11. A method as described in claim 8 wherein the first aggregation node has summarized information of the internal nodes and the source node of the first network, and including the step of making available to the internal nodes of the second network the summarized information of the internal nodes and the source node of the first network.

12. A method as described in claim 8 wherein the second aggregation node has summarized information of the internal nodes and the destination node of the third network, and including the step of making available to the internal nodes of the second network the summarized information of the internal nodes and the destination node of the third network.

13. A method as described in claim 8 wherein the link state routing protocol is either Intermediate System to Intermediate System IS-IS), Private Network-to-Network Interface (PNNI) or Open Shortest Path first (OSPF).

14. A method as described in claim 8 wherein optimal is defined in terms of at least one of a plurality of considerations, the plurality of considerations including:
VLAN groups are defined within the context of a given local sub-domain;
a number of VLAN groups is not more than a number of VLANs attached to the sub-domain;
each VLAN group includes as edge bridges within the sub-domain and VLAN group only those bridges attached to all VLANs in the VLAN group; and each edge bridge is contained in at least one VLAN group for all VLANs to which it is attached.

\* \* \* \* \*

UNITED STATES PATENT AND TRADEMARK OFFICE
CERTIFICATE OF CORRECTION

PATENT NO. : 9,148,300 B2  
APPLICATION NO. : 12/746435  
DATED : September 29, 2015  
INVENTOR(S) : Gray et al.

Page 1 of 1

It is certified that error appears in the above-identified patent and that said Letters Patent is hereby corrected as shown below:

Specification

In Column 2, Line 16, delete "node's" and insert -- nodes --, therefor.

In Column 5, Line 15, delete "Level cloud" and insert -- Level 2 cloud --, therefor.

In Column 6, Line 15, delete "bridge (and" and insert -- bridge 10 (and --, therefor.

In Column 6, Line 32, delete "oro/1" and insert -- org/1 --, therefor.

In Column 6, Line 55, delete "8, and" and insert -- 8, 20 and --, therefor.

Claims

In Column 9, Line 45, in Claim 6, delete "IS-IS)," and insert -- (IS-IS), --, therefor.

In Column 10, Line 56, in Claim 13, delete "IS-IS)," and insert -- (IS-IS), --, therefor.

Signed and Sealed this  
Sixteenth Day of August, 2016

Michelle K. Lee  
*Director of the United States Patent and Trademark Office*